Sept. 7, 1943.  C. M. IRWIN  2,329,052
VALVE CONTROL MECHANISM FOR LIQUID TREATING APPARATUS
Filed Jan. 9, 1941  2 Sheets-Sheet 1

Inventor
Chester M. Irwin,
By B. B. Collings
Attorney

Sept. 7, 1943.  C. M. IRWIN  2,329,052
VALVE CONTROL MECHANISM FOR LIQUID TREATING APPARATUS
Filed Jan. 9, 1941  2 Sheets-Sheet 2
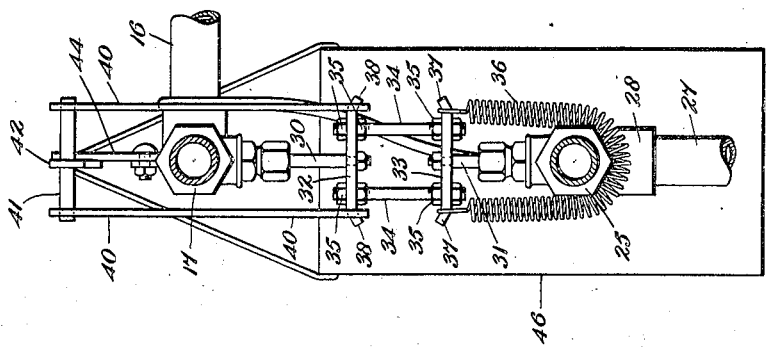
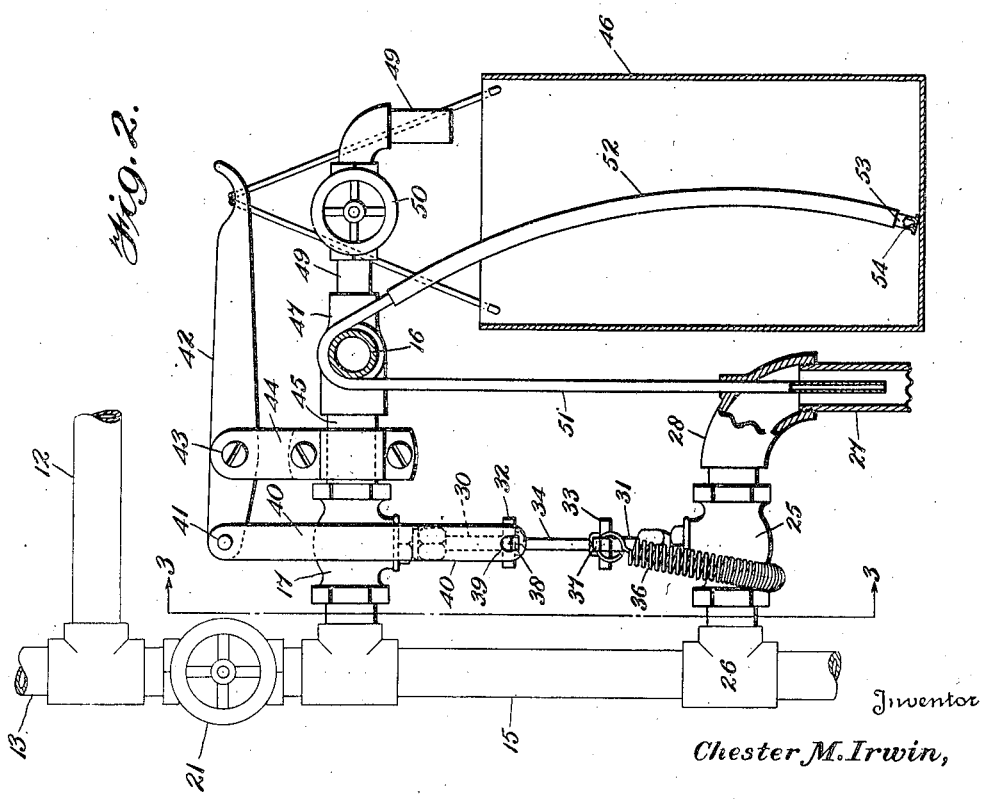
Inventor
Chester M. Irwin,
By
B. B. Collings
Attorney Patented Sept. 7, 1943

2,329,052

UNITED STATES PATENT OFFICE 2,329,052

VALVE CONTROL MECHANISM FOR LIQUID TREATING APPARATUS

Chester M. Irwin, Milwaukee, Wis.

Application January 9, 1941, Serial No. 373,825

7 Claims. (Cl. 210—24)

The invention relates to valve control mechanism for liquid treating apparatus, such for example as base exchange water softeners, filters and the like, and has for one of its objects to provide mechanism for timing the operation of reactivating or regenerating the filtering or water softening material and automatically resetting certain of the valves of the apparatus at the conclusion of such operation, which mechanism will be simple in construction, comparatively inexpensive to manufacture, assemble and install; and more efficient in use than those which have been heretofore proposed.

As is well known to those skilled in the art, after a period of use the base exchange silicates, such as zeolites, now widely used in water softening, become exhausted through the exchange of their bases for those contained in the water being treated, at which time they must either be discarded and replaced by fresh material, or must be regenerated. Since regeneration may be accomplished with relative ease by a simple treatment of the spent zeolites with common salt or brine, and since this regenerating material is far less expensive than the zeolites, practically all commercial water softening apparatus employing zeolites make provision for effecting regeneration of the base exchange silicates in this manner.

Likewise, in some filters for the removal of iron from water, the filtering material is reactivated upon exhaustion by a similar treatment with salt, potassium permanganate, or other chemical. While the apparatus constituting the present invention is suitable for use in connection with all water softening and filtering apparatus of this general character, for purposes of the present disclosure the description will be confined to zeolite water softening apparatus, by way of example but not of limitation.

Base exchange water softening equipment is usually constructed in one of two forms: (1) the tank which contains the granular zeolite through which the water is passed is provided with a charging opening for the zeolites which is normally closed by a removable cap, and through which the salt or other regenerating material may be directly introduced to the zeolites when regeneration of the latter is necessary; and (2) a tank separate from that containing the zeolites is provided, in which separate tank a solution of salt or other reactivating chemical is maintained, which solution is transferred to the zeolite containing tank as may be necessary, by gravity, siphoning, or by means of an ejector.

While regeneration of the base exchange material may be effectively accomplished with this apparatus, the operation requires the manual manipulation of certain valves both at the beginning and at the close of the operation, which may extend over a period of from ten to sixty minutes or more. Several forms of apparatus have been proposed however, for automatically accomplishing at least some of the valve actuations, but so far as I am aware all of these prior proposals have contemplated the use of more or less complicated and expensive elements, such as time clocks, water motors, or spring escapement motors, as well as piston type and diaphragm valves.

It is an important object of my invention, on the other hand, to provide a mechanism for controlling this valve actuation for regenerating purposes which utilizes stock types of valves and pipe fittings such as may be purchased at any plumbing supply house or hardware store, and a minimum number of such other parts of simple construction that the entire apparatus may be constructed, assembled and sold at a price which will make the convenience of automatic regeneration control available to every one who can afford the initial outlay for the water softening or filtering equipment.

Another important feature of the invention resides in the fact that the apparatus provides a valve action which is gentle rather than abrupt or jerky, as would be the case were a trigger mechanism employed, whereby vibration, chattering and hammering of the supply lines is avoided.

With the above and other objects in view which will appear as the description proceeds, the invention consists in the novel details of construction, and novel combinations and arrangements of parts, more fully hereinafter disclosed and particularly pointed out in the appended claims.

Referring to the accompanying drawings forming a part of this specification, in which like reference characters designate like parts in all the views:

Fig. 2 is an enlarged side elevational view, partly in section, of the valve control mechanism illustrated in Fig. 1;

Figure 4:
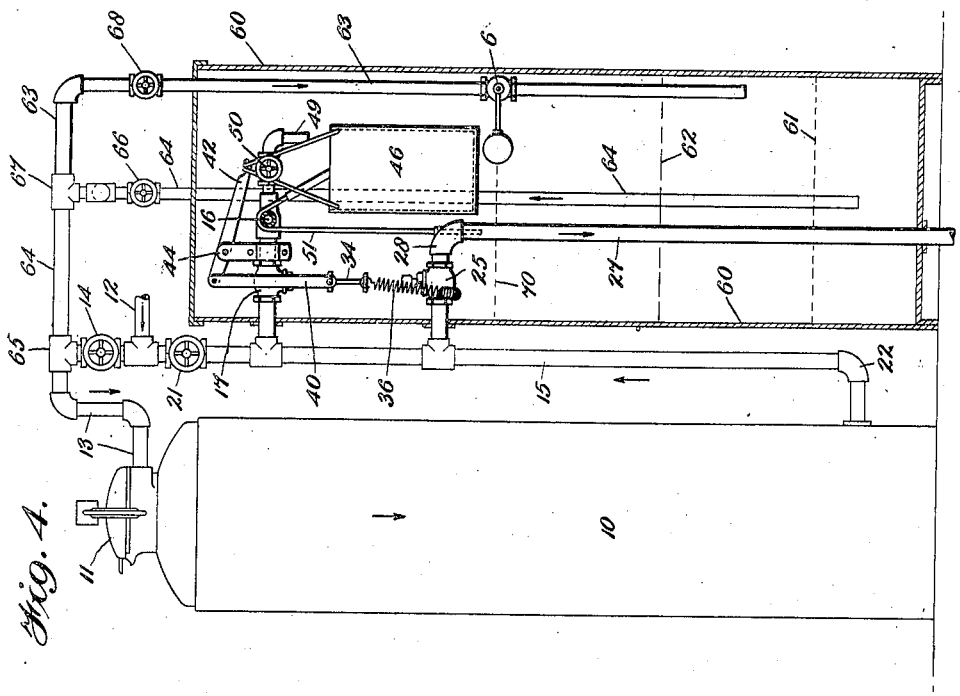

Fig. 3 is a transverse sectional elevational view, taken on the plane indicated by the line 3—3 of Fig. 2, looking in the direction of the arrows; and Fig. 4 is a side elevational view, partly in section, illustrating the application of the valve control mechanism of the present invention to a two-tank down flow type of equipment, with the said control mechanism housed in the upper portion of the brine tank.

Figure 1:
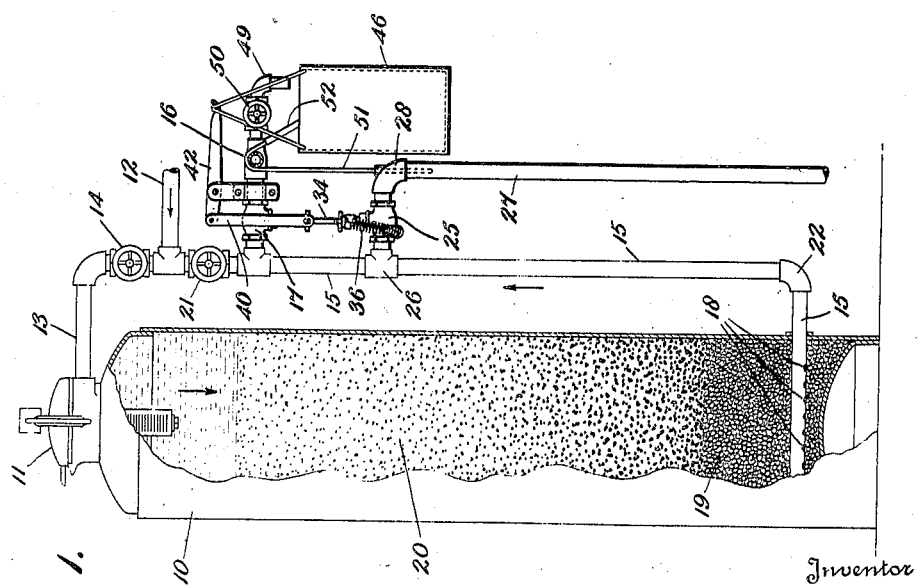
Figure 1 is a side elevational view, partly broken away, of a well known commercial form of the single tank downflow type of base exchange water softening equipment, with valve control mechanism constructed and arranged in accordance with the present invention applied thereto.

Referring more particularly to the said drawings, the water softening equipment illustrated in Fig. 1 comprises a zeolite containing tank 10, having a charging opening at its top which is normally tightly closed by a cover 11. The hard water which is to be treated is introduced into the upper portion of the said tank from the supply main 12 by means of an inlet pipe 13 which is controlled by a manually operable valve 14. An outlet pipe 15 leads from the bottom portion of the tank 10 to the house line 16 through an outlet valve 17. The portion of the pipe 15 which extends into the tank 10 is usually perforated as at 18 to provide for the entry of the water thereto, and this portion of the said pipe is normally embedded in a layer of gravel or coarse sand 19 above which the zeolite or other base exchange material 20 is placed. A valved connection 21 may be provided between the pipes 12 and 15, by means of which, under certain conditions, water from the pipe 12 may be used to flow downwardly in the pipe 15 to the bottom of the tank to reverse-flush the apparatus for cleaning purposes.

Usually the pipe 15 is provided at the elbow 22 with a drain valve which must be manipulated during a regeneration operation, but in carrying out the present invention this valve 25 is elevated to a point just below and in substantial vertical alinement with the outlet valve 17, as will be clear from the drawings, and is connected to the pipe 15 by a T coupling 26 and to a drain pipe 27 by an elbow 28. The valves 17 and 25 must both be operated at the beginning and again at the close of a regeneration operation, 17 being closed and 25 opened at the start, and the action reversed when regeneration is complete.

The valves 17 and 25 are preferably, although not necessarily, of a well known reciprocating type widely used in plumbing work and readily obtainable at relatively low cost, and since in the regeneration operation their movements may advantageously take place simultaneously, their respective stems 30 and 31, which are in substantial axial alinement, are connected together by a suitable adjustable connection, here shown as comprising the horizontal bars 32 and 33, secured to the stems 30 and 31 respectively, and the vertical bolts 34 and nuts 35, see particularly Fig. 3. A helical tension spring 36 may be conveniently passed beneath the body of the valve 25 and have its ends hooked over the end projections 37 of the bar 33, as will be readily understood from the drawings. Obviously, some other form of spring, or a suitable weight, may be substituted for the helical spring 36, since its function is to normally bias the drain valve 25 to closed position and the outlet valve 17 to open position, but the helical springs are cheap and readily obtainable.

The bar member 32 is provided with end projections 38 which are received in apertures 39 formed in the lower ends of a pair of links 40, the upper ends of which are connected as by a pin 41 to one arm of a lever 42 which is pivotally mounted as at 43 on a bracket 44 which may be conveniently clamped upon the pipe or nipple 45 leading from the outlet valve 17, substantially as shown. A liquid-receiving receptacle 46 of suitable capacity is suspended from the other arm of the lever 42, the arrangement being such that the weight of the receptacle and its contents acts in opposition to the force exerted by the spring 36. The force of the spring and the weight of the receptacle are so chosen, however, that when the receptacle is empty it will not overcome the spring and therefore the parts will remain in the positions illustrated in Fig. 2, with the valve 17 open and the valve 25 closed.

A T connection 47 leads from the pipe or nipple 45, to one branch of which the house line 16 is connected, while from its other branch leads a pipe 49, controlled by a valve 50, by means of which water may be supplied to the receptacle 46. For evacuating the receptacle an ejector device is provided, comprising a tube 51, the upper end of which may be conveniently hooked over the pipe 16 and the lower end of which enters the drain pipe 27 through the elbow 28, see Fig. 2. A flexible hose or tubing 52 extends from the upper end of the tube 51 down into the receptacle, and at its lower end is preferably provided with a removable nozzle 53, having a metering or control orifice 54 for determining the rate of discharge of liquid from the receptacle. By providing a plurality of such nozzles having openings of various sizes and substituting one for another, it is possible to secure any desired predetermined rate of discharge of the liquid contents of the receptacle 46.

During the normal operation of the softening or filtering apparatus above described, the parts are in the positions illustrated in Figs. 1 and 2, with the valves 14 and 17 open, the valves 21, 25 and 50 closed, and the receptacle 46 empty. When after continued use the zeolite or other liquid treating material 20 becomes exhausted and in need of regeneration, the valve 14 is closed manually to cut off the supply of water from main 12 to tank 10, the cover 11 opened, the required quantity of salt or other regenerating material is introduced into the tank through the charging opening, and the cover 11 is replaced. The valve 14 is then reopened, and the valve 50 is also opened to supply the receptacle 46 with water from the pipes 49 and 15. As the water flows into the receptacle 46 its weight gradually overcomes the force exerted by the biasing spring 36 and the outlet valve 17 is moved to closed position, cutting off the flow of treated water to the house line 16, and simultaneously therewith the drain valve 25 is opened. The salt which was placed in the upper part of tank 10 has been dissolved in the water therein, forming a brine solution, which passes down through the zeolite material 20, reactivating the same by restoring its sodium silicate content in the well known manner. The regenerating liquid passes out through the pipe 15 to valve 25 and drain pipe 27 and in passing through the latter pipe produces an ejector action in the tube 51 which gradually withdraws the liquid from the receptacle 46. The capacity of this receptacle is preferably such that when it is completely filled, at least 50% or more of its contents must be discharged before the biasing spring 36 will begin to restore the valves 17 and 25 to their respective normal positions, whereby ample time is allowed to effect complete regeneration of the material 20. This time period may also be varied by substitution of a nozzle 53 having a larger or smaller opening 54, as will be readily understood.

The liquid still remaining in the receptacle 46 when the spring 36 commences its valve restoring movement, although constantly diminishing, will retard the action of the spring and cause the valve 17 to be opened and the valve 25 to be closed gently, thus avoiding vibration, chattering and/or hammering in the supply lines. After the initial operation of placing the salt in the tank 10 and the manual manipulation of the valves 14 and 50, no further attention on the part of the operator is required, since the system is automatically restored to operating condition when the mechanism of the present invention has restored the valves 17 and 25 to open and closed position respectively.

In Fig. 4 there is illustrated the application of the present mechanism to a plural tank type of water softening or filtering equipment. In this type of apparatus a second tank 60 is provided, adjacent the tank 10, for containing a solution of salt or other regenerating agent. A layer of gravel or coarse sand is deposited in the bottom of the tank 60 approximately to the level indicated by the broken line 61, upon which a quantity of rock salt or other suitable chemical is superposed to approximately the level indicated by the broken line 62, and water to dissolve such chemical may be introduced through a pipe 63. A brine withdrawal pipe 64 extends down into the tank 60 substantially as shown, being connected as at 65 to the pipe 13 and provided exteriorly of the tank with a manually controlled valve 66. The pipe 63 for introducing the water into the tank may be connected to the pipe 64 as at 67, and is provided with a manually controlled valve 68 exteriorly of the tank, and with a float controlled valve 69 interiorly thereof, the purpose of which is to automatically limit the introduction of water into the tank to prevent the brine level from rising above that indicated by the broken line 70.

The valve control mechanism of the invention may be essentially the same for this type of apparatus as that previously described, but such mechanism, together with the valves 17 and 25, is preferably positioned in the upper portion of the tank 60 substantially as shown. The maintenance of the brine level not higher than the line 70 by the float valve 69 will protect the parts of the mechanism from the brine and prevent the latter from buoying or entering the receptacle 46 to render the mechanism inoperative.

During normal operation of this form of the apparatus, valves 14 and 17 are open, while valves 21, 25, 50, 66 and 68 are closed. When regeneration is necessary, the salt or other chemical is placed in tank 60 and valve 68 opened to admit water from main 12 through pipes 64 and 63 to dissolve it. The float valve 69 will automatically cut off this water supply when the level 70 is reached, but the valve 68 should also be closed before proceeding. The tank 60 may be of capacity to hold sufficient solution for several regenerations, in which event this preparation of the regenerating solution will not be necessary at each regeneration.

With the solution prepared, valve 14 is closed, valve 66 opened, and the receptacle 46 filled by opening valve 50, which is then again closed. As in the single tank type, as the receptacle 46 fills it overcomes the force of the spring 36, closing valve 17 and opening drain valve 25. The hydrostatic head in tank 10 causes liquid to flow therefrom through pipe 15, valve 25 and pipe 27, which draws regenerating solution from tank 60 through pipes 64 and 13 into the upper end of tank 10. When sufficient solution to effect regeneration has thus been supplied to tank 10, valve 66 is closed and valve 14 reopened, whereupon the mechanism proceeds to function as above described in connection with the single tank type.

The mechanism of this invention possesses the important advantage that it automatically compensates for variations in water pressure in the main 12, since the suction in tube 51 varies in accordance with such pressure. In other words, if the water pressure be high so that the water passes through the tank 10 relatively rapidly, the suction produced in tube 51 by its flow through drain pipe 27 will be correspondingly high and the vessel 46 will be emptied in a short space of time. On the other hand, if the pressure in main 12 be low the flow in tank 10 and drain 27 is correspondingly lowered, and suction in tube 51 is lower so that it will take longer to empty receptacle 46, with the result that the regeneration period will be lengthened. Fluctuating pressures in main 12 will of course also be automatically compensated.

It will be obvious that those skilled in the art may vary the details of construction as well as the precise arrangement of parts without departing from the spirit of the invention and therefore it is not wished to be limited to the above disclosure except as may be required by the claims.

What is claimed is:

1. Valve controlling mechanism for liquid treating apparatus of the type having a receptacle for containing a liquid treating material which is capable of being regenerated, and a regenerating agent, means for supplying liquid to said receptacle, piping for discharging liquid therefrom, and a plurality of valves for controlling the flow of liquid in different portions of said piping: said mechanism comprising means for interconnecting said valves to cause them to move in unison; means for biasing said valves, one to open and another to closed position; a gravity-influenced liquid container connected to said valves and acting in opposition to said biasing means; means for supplying liquid to said container, to cause it to counteract said biasing means and reverse the positions of the respective valves at the beginning of an operation to regenerate the liquid-treating material in the receptacle; and means for discharging liquid from the container during the regenerating operation at rates proportionate to varying liquid pressures in the apparatus, to gradually relieve the counteraction of the container to said biasing means, whereby at the conclusion of said operation the valves will have been restored to their respective initial positions.

2. Valve controlling mechanism for liquid treating apparatus of the type having a receptacle for containing a liquid treating material which is capable of being regenerated, and a regenerating agent, means for supplying liquid to said receptacle, piping for discharging liquid therefrom, and a plurality of valves for controlling the flow of liquid in different portions of said piping: said mechanism comprising means for interconnecting said valves to cause them to move in unison; means for biasing said valves, one to open and another to closed position; a gravity-influenced liquid container connected to said valves and acting in opposition to said biasing means; means for supplying liquid to said container; to cause it to counteract said biasing means and reverse the positions of the respective valves at the beginning of an operation to regenerate the liquid-treating material in the receptacle; and means directly actuated by flow of the liquid in the discharge pipe of the receptacle for discharging liquid from the container during the regenerating operation at rates proportionate to varying liquid pressures in the apparatus, to gradually relieve the counteraction of the container to said biasing means, whereby at the conclusion of said operation the valves will have been restored to their respective initial positions.

3. Valve controlling mechanism for liquid treating apparatus of the type having a receptacle for a liquid treating material which is capable of being regenerated, and a regenerating agent, means for supplying liquid to said receptacle, a pipe having at least two branches for discharging liquid therefrom, and separate valves for controlling the flow of liquid in each of said branches; said mechanism comprising means for interconnecting said valves to cause them to move in unison; means for biasing said valves, one to open and the other to closed position; a gravity-influenced liquid container connected to said valves and acting in opposition to said biasing means; means for supplying liquid to said container; to cause it to counteract said biasing means and reverse the positions of the respective valves at the beginning of an operation to regenerate the liquid-treating material in the receptacle; and ejector means actuated by liquid passing through the then open valve for withdrawing liquid from said container during said operation at rates proportionate to the liquid-flow through said valve, to vary the effect of the container upon the valves, whereby they will have been restored to their respective initial positions by said biasing means at the conclusion of the regenerating operation.

4. Valve controlling mechanism for liquid treating apparatus of the type having a receptacle for holding a liquid treating material which is capable of regeneration, and a regenerating agent, means for supplying liquid to said receptacle, a pipe having at least two branches for discharging liquid therefrom, and separate valves for controlling the flow of liquid in each of said branches; said mechanism comprising means for interconnecting said valves to cause them to move in unison; means for biasing said valves, one to open and another to closed position; a lever pivotally mounted adjacent said valves; a link connection between one arm of said lever and said interconnecting means; a liquid container attached to another arm of said lever for gravitationally opposing said biasing means; means for supplying liquid to said container whereby at the beginning of a regenerating operation it may overcome said biasing means and reverse the positions of the respective valves; and ejector means communicating with said container and operable by liquid flowing through the receptacle discharge pipe to withdraw liquid from the container as the regenerating operation proceeds, whereby at its conclusion said biasing means will have restored the valves to their respective initial positions.

5. In liquid treating apparatus of the type having a receptacle for holding a liquid treating material which is capable of regeneration, and a regenerating agent, means for supplying liquid to said receptacle, piping for discharging liquid from the receptacle, including an outlet pipe and a drain pipe, and separate valves for controlling the flow of liquid in said outlet and drain pipes respectively: means for controlling said valves during an operation to regenerate the liquid treating material in the receptacle, comprising means for interconnecting said valves to cause them to move in unison; means for biasing the outlet pipe valve to open position and the drain pipe valve to closed position; a liquid container connected to said valves to gravitationally oppose said biasing means; means for supplying liquid to said container, whereby at the beginning of a regeneration operation it may overcome said biasing means and reverse the positions of the respective valves; and an ejector tube extending from said container to within said drain pipe, whereby liquid flowing through the latter will cause a withdrawal of liquid from the container as the regenerating operation proceeds, thus reducing the counteraction of the container to the biasing means and resulting in a restoration of the respective valves to their initial positions at the conclusion of the operation.

6. In liquid treating apparatus of the type having a receptacle for holding a liquid treating material which is capable of regeneration, and a regenerating agent, means for supplying liquid to said receptacle, piping for discharging liquid from the receptacle, including an outlet pipe and a drain pipe, and separate valves for controlling the flow of liquid in said outlet and drain pipes respectively: means for controlling said valves during an operation to regenerate the liquid treating material in the receptacle, comprising means for interconnecting said valves to cause them to move in unison; means for biasing the outlet pipe valve to open position and the drain pipe valve to closed position; a liquid container connected to said valves to gravitationally oppose said biasing means; means for supplying liquid to said container, whereby at the beginning of a regeneration operation it may overcome said biasing means and reverse the positions of the respective valves; a flexible ejector tube extending from said container to within said drain pipe, whereby liquid flowing through the latter will cause a withdrawal of liquid from the container as the regenerating operation proceeds, thus reducing the counteraction of the container to the biasing means and resulting in a restoration of the respective valves to their initial positions at the conclusion of the operation; and means for metering the flow of liquid through said ejector tube whereby to control the duration of the regenerating operation.

7. In liquid treating apparatus of the base exchange silicate or similar type, having a receptacle for the liquid treating material, means for conducting liquid to said receptacle and for discharging it therefrom, a second receptacle for containing a regenerating liquid for said material, and liquid-transfer connections between said receptacles, valves for said receptacle discharging means positioned within said second receptacle for controlling the flow of liquid to be treated through the first receptacle; means also positioned in said second receptacle for controlling the operations of said valves; and means for preventing the level of the regenerating liquid in the second receptacle from reaching said valves and control means therein.

CHESTER M. IRWIN.